United States Patent

[11] 3,608,800

| [72] | Inventor | George J. Zahradnik<br>Wheaton; Fred S. Golden, Chicago,<br>both of Ill. |
|---|---|---|
| [21] | Appl. No. | 22,520 |
| [22] | Filed | Mar. 25, 1970 |
| [45] | Patented | Sept. 28, 1971 |
| [73] | Assignees | A. B. Dick Company<br>Chicago, Ill. |

[54] INTERMITTENT FILM-FEEDING MECHANISM
6 Claims, 9 Drawing Figs.

[52] U.S. Cl. .................................................. 226/62,
352/194
[51] Int. Cl. ................................................. G03b 1/22
[50] Field of Search ........................................ 226/62,
70–73; 352/194, 196

[56] References Cited
UNITED STATES PATENTS
2,420,444  5/1947  Ress ............................... 226/72

2,986,316  5/1961  Petersen ....................... 226/62 X

Primary Examiner—Richard A. Schacher
Attorney—Johnson, Dienner, Emrich, Verbeck and Wagner ABSTRACT: An intermittent film-feeding mechanism for advancing a motion picture film frame by frame across a film guide block has an elongated slit opening in the path of the perforations at one edge of the film for receiving a claw, and having resilient finger members engaging the opposite edges of the film to cause the perforations along said one edge of the film to pass over the slit opening. A shuttle assembly has a claw and two cam followers that cooperate with two cams of a claw drive assembly to move the claw in a closed loop path for advaNcing the film frame by frame. A spring member biases the shuttle assembly about two movable pivot members such that the claw rubs against one of the sidewalls which define the slit opening to prevent any lateral movement of the claw relative to the slit opening.

Inventors:
George J. Zahradnik,
Fred S. Golden.
By Johnson, Dienner, Emrich, Verbeck & Wagner
Attys.

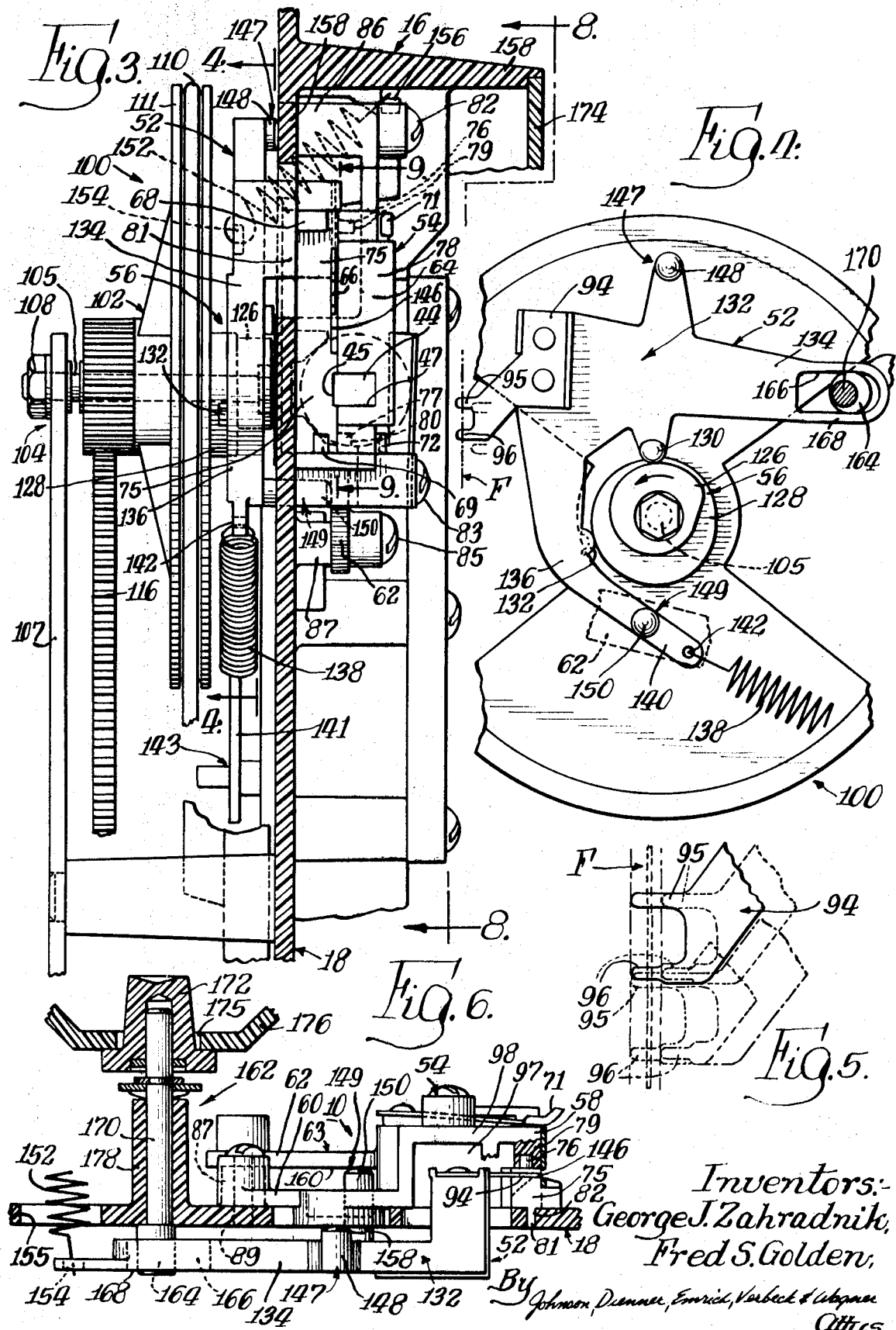

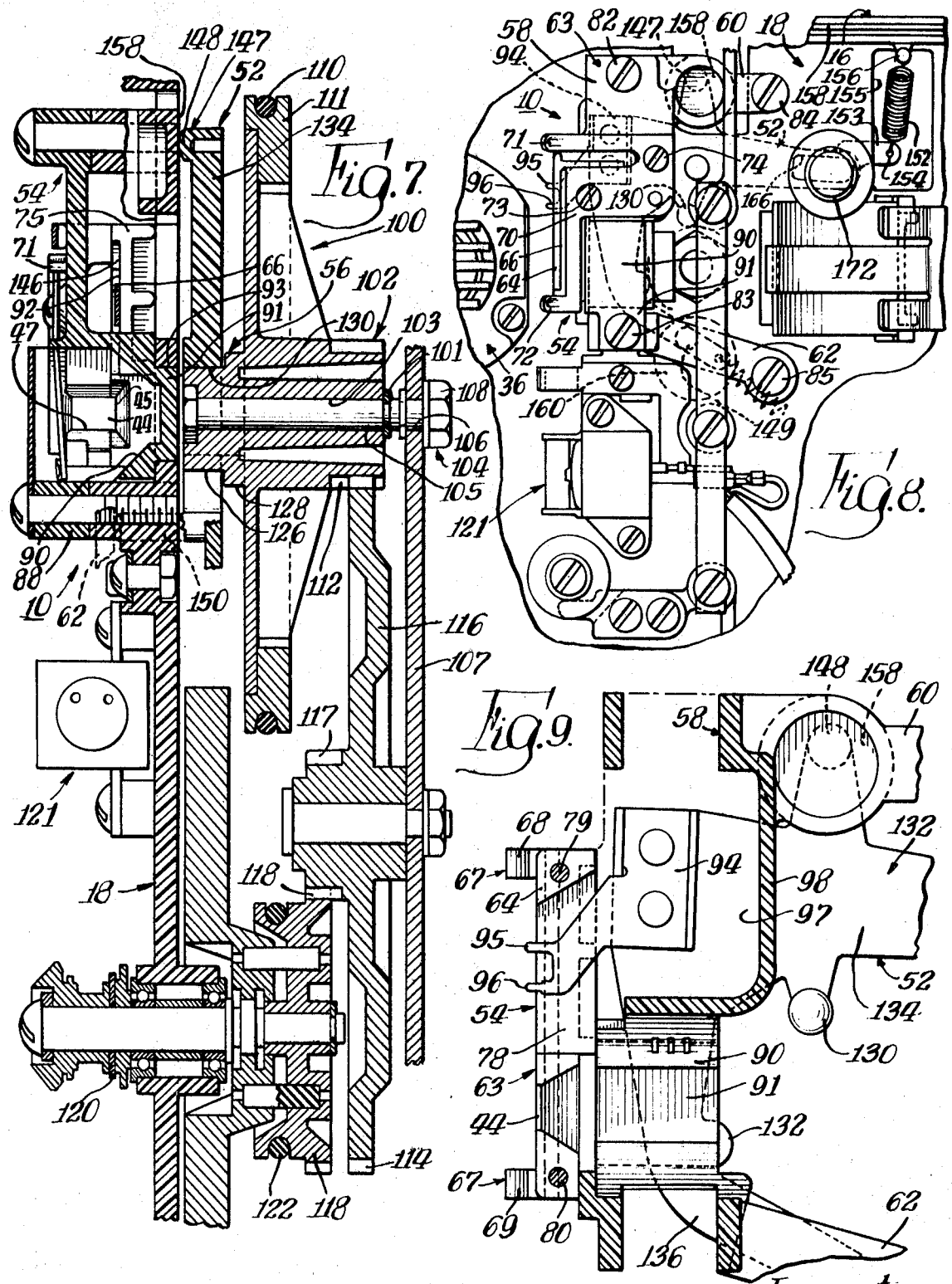

INTERMITTENT FILM-FEEDING MECHANISM

BACKGROUND OF THE INVENTION

Since a roll of movie film can be expected to be shown repeatedly in a movie projector, it is important that the film feed drive mechanisms of the projector pull on the film's perforations with a minimum amount of wear. Most of the wear and damage to the film's perforations is caused by the claw of the intermittent film-feeding mechanism due to its teeth striking the film portion surrounding the perforations as the claw teeth are moved inwardly to enter the perforations. To prevent this damaging contact with the film, the claw must consistently enter the film's perforations without engaging any portion of the film.

Accordingly, an object of this invention is to provide an intermittent film-feeding mechanism that drives and guides a claw relative to a film guide assembly such that the claw's teeth enter the perforations of a film without contacting any film portion surrounding the periphery of the perforations.

Another object of this invention is to provide an intermittent film-feeding mechanism having a film and claw guide assembly with guide members directing the film along a straight path relative to an elongated slit opening for receiving the claw, a shuttle assembly which drives the claw in a closed loop path, and means to urge the claw against one of the sidewall surfaces forming the slit opening to prevent any lateral movement of the claw so that the claw teeth will repeatedly enter each film perforation without touching the film surface on the inward motion.

SUMMARY OF THE INVENTION

An intermittent film-feeding mechanism for advancing a movie film frame by frame is constructed to operate as three interconnected cooperating assemblies: a shuttle assembly, a film and claw guide assembly, and a claw drive assembly. The three assemblies are mounted on a sidewall of the movie projector housing having a shallow pan-shaped housing secured to its outside surface for providing a pocket or receptacle to receive a movie film cartridge.

The film and claw guide assembly is mounted on the outside surface of the above-identified sidewall and has a film guide block with a vertical surface disposed in the film path when the cartridge is inserted in the receptacle. An elongated slit opening for receiving a claw is formed in the vertical surface and a film guide member extends from the vertical surface to engage one edge of the film for directing the film to move in a straight line parallel to the slit opening such that the film's perforations along the one edge pass directly over the slit opening. A resilient member extending from the vertical surface of the film guide block engages the opposite edge of the film and urges the film towards the film guide member. The claw drive assembly is formed integrally with the shutter pinwheel on a rotatably mounted shaft member and has two cams. One of the cams is designed to cooperate with a cam follower on the shuttle assembly to provide up and down movement of the claw and the other cam cooperates with a second cam follower to provide the in and out movement of the claw.

The shuttle assembly is constructed as a one-piece, two-legged structure to which a claw is fastened at the juncture of the leg portions. The shuttle assembly is supported inside the projector housing between the claw drive assembly and the sidewall which supports the film cartridge receptacle. An integral cam follower is formed on each of the leg portions of the shuttle assembly which followers are urged to ride on the cams of the claw drive assembly by means of a spring member. Each of the leg portions also include an integral protrusion which protrusions are arranged to extend through openings in the above-mentioned sidewall of the movie projector housing and engage corresponding bearing surfaces carried by the film and claw guide assembly. A second spring member urges the shuttle assembly to pivot about the two protrusions such that the claw is caused to rub against one of the sidewall surfaces forming the slit opening in the film guide block to prevent any lateral movement of the claw as it moves about the closed loop path and to thereby cause the teeth of the claw to enter the perforations consistently without contacting the film area around the perforations.

To provide for proper vertical registration between projected picture and screen the invention includes a means to selectively raise or lower the leg portion having the cam follower that rides on the cam controlling the up and down movement of the claw.

BRIEF DESCRIPTION OF THE DRAWINGS

For a better understanding of the present invention, reference may be had to the accompanying drawing in which:

FIG. 3 is a cross-sectional view taken along the line 3—3 of FIG. 2;

FIG. 4 is a cross-sectional view of the intermittent feed mechanism of FIG. 2 taken along the line 4—4 of FIG. 3 looking in the direction of the arrows;

FIG. 5 illustrates the sequence of positions of the claw to advance a filmstrip one frame;

FIG. 6 is a sectional view taken along the line 6—6 of FIG. 2 and looking in the direction of the arrows;

FIG. 7 is a sectional view of FIG. 2 taken along the line 7—7 and looking in the direction of the arrows;

FIG. 8 is a partial sectional view of FIG. 3 taken along the line 8—8 and looking in the direction of the arrows; and FIG. 9 is a sectional view of FIG. 3 taken along the line 9—9 and looking in the direction of the arrows.

DESCRIPTION OF THE PREFERRED EMBODIMENT

Figure 1:
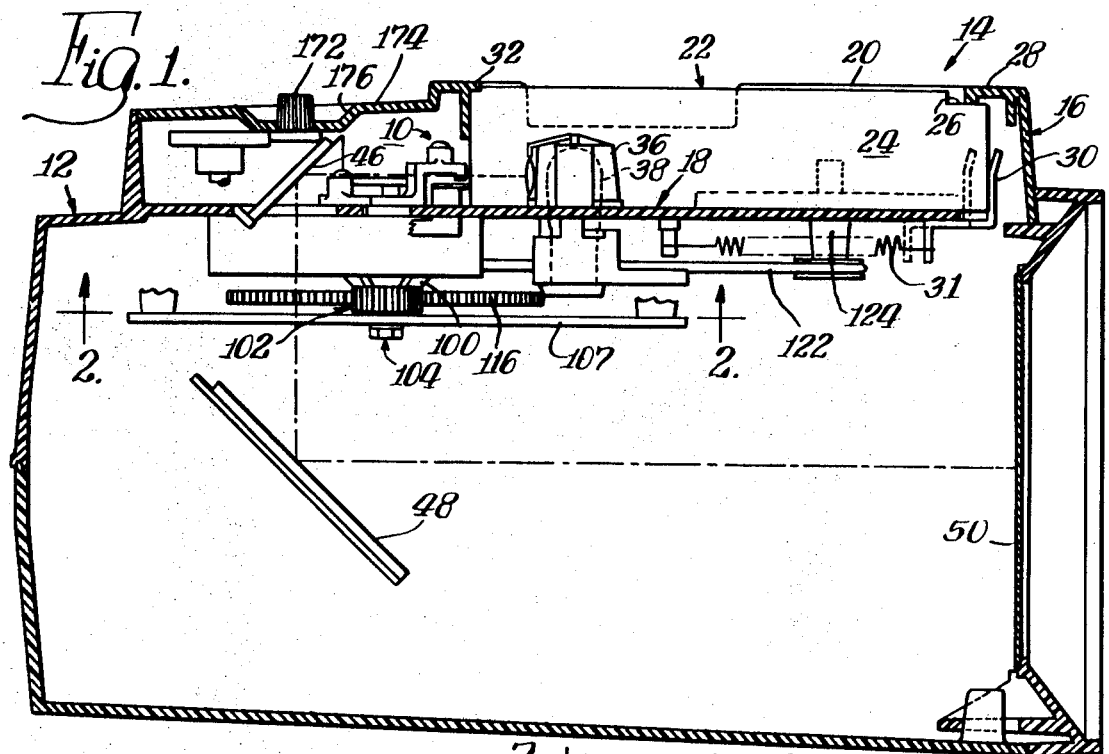
FIG. 1 is a horizontal sectional view of the inside of a movie projector having an intermittent film feed mechanism embodying the principles of the present invention.

There is shown in FIG. 1, an illustration of an intermittent film feed mechanism, incorporating the principles of this invention and generally designated by the reference numeral 10, which is supported on one of the sidewalls of a movie projector generally designated by the reference numeral 12.

Since the movie projector 12 forms no part of the present invention, it is not shown in complete detail. For a complete disclosure of the movie projector illustrated in FIG. 1, reference is made to copending application Ser. No. 722,646, which is assigned to the same assignee as this invention and which is the invention of Otto R. Nemeth and is entitled "Film Handling System." It is to be noted that the intermittent film feed mechanism 10 is shown with the movie projector 14 for illustration purposes only and could be incorporated with any commercial movie projector.

Briefly, the movie projector 14 has an oblong box-shaped housing 12 with a generally pan-shaped housing 16 secured to one sidewall 18. A rectangular-shaped opening 20 is provided in the pan-shaped housing 16 for receiving a film cartridge 22 into a film cartridge receptacle 24 defined therein. To insert the cartridge 22 in the receptacle 24, it is necessary to first insert the right end (as viewed in FIG. 1) such that the recess portion 26 of the cartridge 22 slides behind the lip 28. The cartridge is then pushed rearwardly (towards the right) against the finger 30 until the front end of the cartridge 22 clears the lip 32 of the housing 16. The cartridge 22 is then swung towards the wall 18 until its back surface engages the outside surface of the wall 18 of the projector housing 12. Through the pulling force exerted by spring 31, the finger 30 then pushes the cartridge 22 forward until the cartridge 22 is stopped by the boss 34 (FIG. 7). In this position, the cartridge 22 is in an operative relationship with the various operating members of the movie projector 14, including the intermittent film feed mechanism 10. A lamp housing 36 is mounted in an opening in the sidewall 18 of the housing 12 such that the lamp housing 36 and lamp 38 extend through an opening in the body portion of the cartridge 22. Light from the lamp 38 passes a film aperture (not shown) in the film gate of the cartridge 22, through the frame of film in the cartridge and through the film aperture 44 (FIG. 9) in the intermittent feed mechanism 10. From film aperture 44, the image from the film is directed through the projector wall 18 by a reflector 46 and a second reflector 48 directs the image to the rear of the translucent screen 50, as shown in FIG. 1.

The intermittent film feed mechanism 10 consists of three interconnected cooperating assemblies; a shuttle assembly 52, a film and claw guide assembly 54, and a claw drive assembly 56. The film and claw guide assembly 54 is mounted on the outside surface of the sidewall 18 of movie projector housing 12 and the claw drive assembly 56 is supported on the inside surface of the sidewall 18. The shuttle assembly 52 is supported in a floating relationship between the film and claw guide assembly 54 and the claw drive assembly 56.

The film and claw guide assembly 54, has a central body portion 58 and a pair of arms 60 and 62 extending from the ends of the body portion 58 to define a U-shaped structure 63. The central body portion 58 includes a vertical film guide surface 64 which is in direct alignment with the film gate provided in the forward face of the film cartridge 22. A film aperture 44 and an elongated slit opening 66 are formed in the vertical guide surface 64. A guide member 67 in the form of two studs 68 and 69 (see FIG. 9) extend from the opposite ends of the vertical guide surface 64 to engage one end of the film for directing the film F in a straight line parallel to the slit opening 66 such that the film's perforations adjacent to that edge pass directly over the slit opening. A resilient member 70 in the form of two resilient fingers 71 and 72 (FIG. 8) also extend from the vertical guide surface 54 to engage the opposite edge of the film F and constantly urge the film F toward the film guide member. As best seen in FIG. 8, the resilient member 70 is a one-piece thin metal strip secured to the central body portion 58 by two screws 73 and 74.

The film and claw guide assembly 54 is preferably made of a molded plastic material, except for the resilient member 69. Because the central body portion 58 has a rather complex configuration, the structure forming part of the vertical guiding surface 64 is molded as a separate part, namely the rubbing block 75 shown in FIGS. 3, 6 and 7. The rubbing block 75 carries the previously mentioned guide studs 68 and 69 of the film guide member 67, and is mounted to block 78 by means of ears 76 and 77 (FIG. 3) inserted and frictionally engaged in apertures 79 and 80 of block 78 (FIG. 9). A lip 81 (FIG. 3) extending in the opposite direction from the ear 76 and 77 inserts in an elongated slit opening 82 formed in the sidewall 18 which firmly holds the rubbing block 75 in place upon the U-shaped structure 63 being mounted to the sidewall 18 by means of screws 82, 83, 84 and 85 (FIG. 8) inserted through suitably formed apertures at the four corners of the U-shaped structure 63 and threaded into bosses 86, 87, 88 and hole 89 (FIGS. 3, 6 and 7) respectively, formed on the sidewall 18 with internally threaded openings.

The film image aperture 44 is formed by means of the shallow cutout 45 in rubbing block 75 mating with the U-shaped recess 47 in block 78. To provide an unobstructed path for the film image to pass through the film and claw guide assembly 54, a deep U-shaped recess 90 (FIGS. 7 and 9) is formed in the central body portion 58 directly behind the film image aperture 44. The bight portion of recess 90 has a square plate segment 91 which is received in a complementary square cutout 93 in sidewall 18 to assist in locating and seating the claw and film drive assembly 54 thereon.

The claw slit opening 66 is formed by providing a relatively long recess 92 in rubbing block 75. To provide a passageway for receiving the claw 94 and its pair of teeth 95 and 96, the central body portion 58 is recessed behind and above the claw slit opening 66 having a wall segment 97 with an L-shaped internal flange 98.

The arm portions 60 and 62 of the U-shaped structure 63 assists in mounting the film and claw drive assembly 54 to the sidewall 18 but primarily functions to provide bearing surfaces that cooperate with the shuttle assembly 52 in a manner to be described hereinafter in complete detail.

Figure 2:
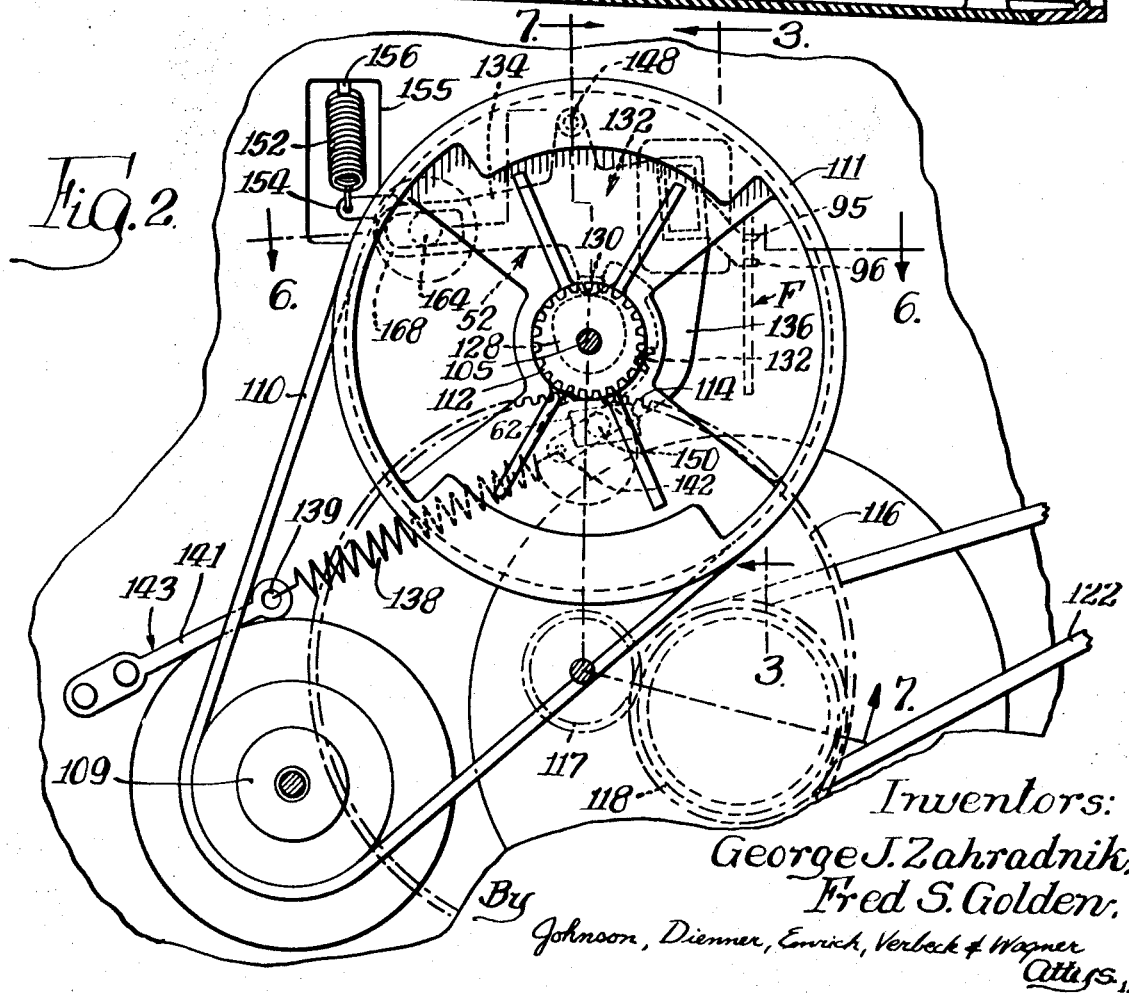
FIG. 2 is an enlarged partial elevational view of FIG. 1 showing the intermittent film feed mechanism as viewed from the inside of the movie projector of FIG. 1 taken along the line 2—2 looking in the direction of the arrows.

The driving action for moving the claw 94 in a closed loop path is provided by the claw drive assembly 56, which is formed integrally with the pinwheel shutter 100. The pinwheel shutter 100 has an inner hub portion 102 (FIG. 7) with a central axial bore 103 rotatably mounted on shaft member 104, consisting of a bolt 105 passing through an opening 106 in vertical support plate 107 (partially shown) which is mounted to vertical support plate 107 by means of nut 108. A retaining ring 101 is snapped in a groove on the outer end of bolt 105 to secure the pinwheel shutter 100 on shaft member 104. The pinwheel shutter 100 is driven by the output shaft 109 (FIG. 2) of an electric motor (not shown) through a belt drive arrangement provided by belt 110 wrapped about its outer rim 111 (FIG. 7). The pinion gear teeth 112 (FIGS. 2 and 7) on the outer end of hub portion 102 mesh with gear teeth 114 of gear 116. A similar gear teeth arrangement is provided by pinion gear 117 and gear 118 to drive sprocket wheel 120 which pulls the film past the sound head 121 (see FIG. 8) disposed directly below the intermittent film-advancing mechanism 10. A similar drive pulley arrangement is provided by belt 122 which connects to a shaft 124 (FIG. 1) provided to rotate the drive member for the film cartridge 22. For a more complete description of the various drive members in movie projector 12 and their particular functions, reference is made to the above-mentioned Nemeth application.

As shown in FIGS. 3 and 4, at the inner end of the hub portion 102 of pinwheel shutter 100 is a pair of cams 126 and 128. Cam followers 130 and 132 of shuttle assembly 52 ride, respectively, on cams 126 and 128 to cause the claw 94 to move in a closed loop path as pictorially shown in FIG. 5, where the cam 126 provides the up and down movement and the cam 128 provides the in and out movement. The technique for selecting the particular shape of cams 126 and 128 is known in the art and forms no part of this invention.

The shuttle assembly 52 used a V-shaped molded structure 132 having two leg portions 134 and 136 with the claw 94 fastened at their juncture by rivets or like means. The cam followers 130 and 132 are urged to ride on the respective cam surfaces of cams 126 and 128 by virtue of a spring 138, which as shown in FIG. 4 pulls outwardly on the outer end 140 of leg portion 136. Spring 138 is connected in a stretched condition between eyelet 142 formed in the outer end 140 of leg portion 136 and the eyelet 139 at the outer end 141 of a fastener 143 mounted on the inside surface of sidewall 18.

One of the most important advantages of this invention is that the teeth 95, 96 of claw 94 are caused to repeatedly enter the film perforations without contacting the surrounding surfaces to avoid any damaging to the film portion around each perforation. This objective is made possible by guiding the film across the vertical guide surface 64 such that the perforations pass directly over the claw slit opening 66 and further by maintaining the claw 94 in a fixed orienting relationship relative to the slit openings 66 as the teeth 95, 96 enter, travel along an exit from the slit opening 66. The means for guiding the film across he vertical guide surface 64 has been described herein before. The fixed orienting relationship of claw 94 is obtained by causing the teeth 95, 96 to always rub against one of the elongated surfaces which define the claw slit opening 66, namely the elongated surface 146 (FIGS. 3, 6 and 7) formed by the shallow recess 92 in rubbing block 75. This rubbing action is provided by pivoting V-shaped structure 132 of shuttle assembly 52 about two pivot members 147 and 149 (FIG. 4) through the constant pull exerted by spring 152 on the outer end 153 of leg portion 134. The pivot members 147 and 149 are formed as two circular protrusions 148 and 150 formed integrally on leg portions 134 and 136, respectively, of V-shaped structure 132. Referring to FIG. 8, one end of spring 152 extends through a rectangular opening 155 formed in the sidewall 18 and is hooked through the eyelet 154 at the outer end of the leg portion 134 and the other end is hooked over stud 156 which is an integral projection extending downwardly from the top wall 158 of pan-shaped housing 16.

The circular protrusions 148 and 150 are constantly urged by spring 152 to ride against bearing surfaces 158 and 160 on the arm portion 60 and 62 of the U-shaped structure 58 resulting in the teeth 95, 96 bearing against the elongated surface 146 of rubbing block 75 for all positions of the claw 94. Each protrusion 148 and 150 repeatedly follows an oval path whose size is quite small compared to the closed loop path of claw 94.

To provide for proper vertical registration between projected picture and screen 50, a picture centering device 162 is provided to selectively shift the angular position of leg portion 134 of V-shaped structure 132. The centering device 162 consists of an eccentric 164 (FIG. 6) which cooperates with an oblong slot 166 in leg portion 134 to move the outer end 168 of leg portion 134 either up or down by turning shaft 170 through the rotation of adjustment knob 172. The knob 172 is conveniently located outside the movie projector 14 on a plate member 174 of pan-shaped housing 16 extending through an opening 175 in a shallow well 176. The shaft 170 is supported in a hollow sleeve 178 formed integrally on the outside surface of sidewall 18.

We claim:

1. An intermittent film feed mechanism for advancing frame by frame a motion picture film comprising a shuttle assembly, a film and claw guide assembly and a claw drive assembly, said film and shuttle guide assembly including a surface portion adapted to be disposed in the film's path of travel, means to guide the film across said surface portion such that the perforations along one edge of the film move in a straight line and pass over an elongated slit opening formed in said surface portion, said claw drive assembly including a rotatably mounted shaft member carrying a pair of cams, and said shuttle assembly including a claw, a pair of cam followers, means to bias each of said cam followers against one of said cams to cause said claw to move in a closed loop path in response to said shaft member being rotated and means to urge said claw to rub against one of the elongated sidewall surfaces that define said slit opening to prevent any lateral movement of said claw relative to the length of said slit opening.

2. An intermittent film feed mechanism as defined in claim 1, wherein said film and claw guide assembly includes two spaced bearing surfaces disposed behind aid surface portion and wherein said means to urge said claw against said one sidewall surface of said slit opening comprises two unanchored pivot members adapted to slide about said two bearing surfaces as said claw moves in its closed loop path and spring means to urge said shuttle assembly to pivot about said pivot members such that said claw rubs against one of said elongated sidewall surfaces of said slit opening.

3. An intermittent film feed mechanism for advancing frame by frame a motion picture film comprising a shuttle assembly, a film and claw guide assembly and a claw drive assembly, said film and claw guide assembly including a generally U-shaped body having a central body portion and two arm portions, a film guide block extending from the outer surface of said body portion and having one surface adapted to be disposed in the film's path of travel, means to guide one edge of the film across said one surface in a straight line, resilient means to bias the opposite edge of the film towards said film guide means, an elongated slit opening formed in said elongated surface and through said film guide block which is parallel to and spaced from said straight line such that the film perforations passed directly over said slit opening, said claw drive assembly including a rotatably mounted shaft member carrying a pair of cams, and said shuttle assembly including a structure having two interconnected leg portions, a claw secured to said structure at the juncture connecting said leg portions, a cam follower carried by each of said leg portions, first spring means urging one of said cam followers to ride on one of said cams and the other of said cam followers to ride on the other cam to alternately impart up and down movement and in and out movement, respectively, of said claw relative to said slit opening in response to rotation of said shaft member, each of said leg portions of said structure having a protrusion engaging a bearing surface on each of said arm portions of said U-shaped body, and a second spring means exerting a constant pulling force on said shuttle assembly which urges said structure to pivot on said protrusions such that said claw rubs against one of the elongated sidewalls defining said slit opening to prevent any lateral movement of said claw.

4. An intermittent film feed mechanism as defined in claim 3, further comprising a means to selectively shift the angular position of said leg portion of said structure carrying said one cam follower to allow for framing of the movie film to optically project a properly vertically registered frame.

5. An intermittent film feed mechanism as defined in claim 3, wherein said film and claw guide assembly is secured to the rear wall of a film cartridge receptacle formed on the outside surface of one of the sidewalls of a movie projector housing, said shaft member of said claw drive assembly is rotatably mounted in an opening formed in said one sidewall of said housing, and said shuttle assembly is supported between said claw drive assembly and the inside surface of said one sidewall by said cam followers riding on said cams of said shuttle assembly, said first spring means exerting a constant force on one of said leg portions in a direction parallel to said one sidewall, said second spring means exerting a constant force on the other of said leg portions in a direction towards said one sidewall, and said protrusions extending through openings formed in said one sidewall to engage said bearing surfaces of said U-shaped body.

6. An intermittent film feed mechanism as defined in claim 3, wherein said means to guide one edge of the film across said one surface of said film guide block comprises two integral lugs extending from said one surface on opposite ends of said slit opening and said resilient means comprising two spaced resilient fingers extending above said one surface and disposed such that an imaginary line connecting them would be parallel to an imaginary line connecting said two lugs, where the distance between the two imaginary lines is slightly less than the width of a movie film.